United States Patent
Sidelkovskly

(10) Patent No.: US 9,759,133 B2
(45) Date of Patent: Sep. 12, 2017

(54) TURBOFAN WITH VARIABLE BYPASS FLOW

(71) Applicant: Rolls-Royce Corporation, Indianapolis, IN (US)

(72) Inventor: Dmitriy B. Sidelkovskly, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 554 days.

(21) Appl. No.: 14/199,237

(22) Filed: Mar. 6, 2014

(65) Prior Publication Data

US 2015/0128605 A1    May 14, 2015

Related U.S. Application Data

(60) Provisional application No. 61/774,328, filed on Mar. 7, 2013.

(51) Int. Cl.
*F02K 1/30* (2006.01)
*F02C 9/18* (2006.01)
*F02K 1/08* (2006.01)

(52) U.S. Cl.
CPC .................. *F02C 9/18* (2013.01); *F02K 1/08* (2013.01); *F02K 1/30* (2013.01)

(58) Field of Classification Search
CPC ..... F02K 1/08; F02K 1/30; F02K 1/46; F02K 1/09; F02K 1/386; F02K 1/383; F02K 1/28; F02K 1/605; F02K 3/075; F02C 6/08
USPC .................................................... 60/231, 771
See application file for complete search history.

(56) References Cited

U.S. PATENT DOCUMENTS

| | | | | |
|---|---|---|---|---|
| 3,598,318 | A * | 8/1971 | Schiel ...................... | F02K 1/06 239/265.13 |
| 4,005,575 | A * | 2/1977 | Scott ........................ | F02K 3/04 415/61 |
| 4,043,121 | A | 8/1977 | Thomas et al. | |
| 4,050,242 | A | 9/1977 | Dusa | |
| 4,577,462 | A * | 3/1986 | Robertson ............... | F02K 1/386 181/220 |
| 4,598,543 | A | 7/1986 | Brewer | |
| 5,044,153 | A * | 9/1991 | Mouton .................. | F02C 7/052 415/121.2 |
| 5,261,227 | A | 11/1993 | Giffin, III | |
| 5,485,717 | A | 1/1996 | Williams | |
| 5,687,563 | A | 11/1997 | Thompson, Jr. | |
| 5,947,412 | A * | 9/1999 | Berman .................... | B64C 7/02 239/265.17 |
| 6,971,229 | B2 | 12/2005 | Lair | |
| 7,246,484 | B2 | 7/2007 | Giffin, III et al. | |
| 7,614,210 | B2 | 11/2009 | Powell et al. | |
| 7,658,063 | B1 | 2/2010 | Matheny | |

(Continued)

FOREIGN PATENT DOCUMENTS

EP   2426342 A2 *  3/2012   ............... F02C 6/08

*Primary Examiner* — William H Rodriguez
(74) *Attorney, Agent, or Firm* — Barnes & Thornburg LLP

(57) ABSTRACT

A gas turbine engine is disclosed with a bypass flow path having a bypass nozzle positioned downstream of a fan; a core flow path having a compressor, a combustor, a turbine and an exhaust nozzle; an auxiliary duct fluidly connecting the core flow path and the bypass flow path downstream of the turbine; and a control valve operably connected to the auxiliary duct to control fluid flow from the core flow path into the bypass flow path.

19 Claims, 4 Drawing Sheets

(56) References Cited

U.S. PATENT DOCUMENTS

| | | | |
|---|---|---|---|
| 7,877,980 B2 | 2/2011 | Johnson | |
| 7,950,218 B2* | 5/2011 | Beutin | F01D 9/065 239/265.17 |
| 8,096,105 B2* | 1/2012 | Porte | F02K 1/46 60/226.3 |
| 8,336,288 B2* | 12/2012 | Venter | F02C 9/18 60/226.1 |
| 8,468,796 B2* | 6/2013 | Emprin | F02K 1/566 239/265.25 |
| 2005/0210860 A1* | 9/2005 | Gutmark | F02K 1/34 60/204 |
| 2006/0288688 A1* | 12/2006 | Lair | F02K 1/386 60/226.2 |
| 2007/0186535 A1* | 8/2007 | Powell | F02K 1/08 60/226.1 |
| 2007/0240424 A1 | 10/2007 | Matheny et al. | |
| 2008/0141656 A1* | 6/2008 | Beutin | F01D 9/065 60/262 |
| 2008/0250770 A1* | 10/2008 | Emprin | F02K 1/566 60/226.2 |
| 2009/0293449 A1* | 12/2009 | Venter | F02C 9/18 60/226.1 |

* cited by examiner

TURBOFAN WITH VARIABLE BYPASS FLOW

CROSS REFERENCE TO RELATED APPLICATIONS

This application claims priority to and the benefit of U.S. Provisional Patent Application No. 61/774,328, filed 7 Mar. 2013, the disclosure of which is now expressly incorporated herein by reference.

TECHNICAL FIELD

The present disclosure relates to a turbofan engine. More particularly, the present disclosure relates to a turbofan engine having a variable area passageway to divert a portion of a core exhaust stream into a bypass stream.

BACKGROUND

Gas turbine engine designers continuously work to improve engine efficiency, to reduce operating costs of the engine, and to reduce specific exhaust gas emissions such as NOx, CO2, CO, unburned hydrocarbons, and particulate matter. The specific fuel consumption (SFC) of an engine is inversely proportional to the overall thermal efficiency of the engine, thus, as the SFC decreases the fuel efficiency of the engine increases. Furthermore, specific exhaust gas emissions typically decrease as the engine becomes more efficient. The thermal efficiency of a turbofan engine is a function of component efficiencies, cycle pressure ratio, turbine inlet temperature, and the bypass ratio the bypass flow stream to the core flow stream. Gas turbine power systems remain an area of interest for technology improvement. Some existing gas turbine power systems have various shortcomings, drawbacks, and disadvantages relative to certain applications. Accordingly, there remains a need for further contributions in this area of technology.

SUMMARY

One embodiment of the present disclosure is a unique turbofan engine system. Another embodiment includes a turbofan engine having a variable area passageway formed between a core flow stream and a bypass flow stream. Other embodiments include unique apparatuses, systems, devices, hardware, methods, and combinations for gas turbine engine power systems. Further embodiments, forms, features, aspects, benefits, and advantages of the present application shall become apparent from the following description and drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
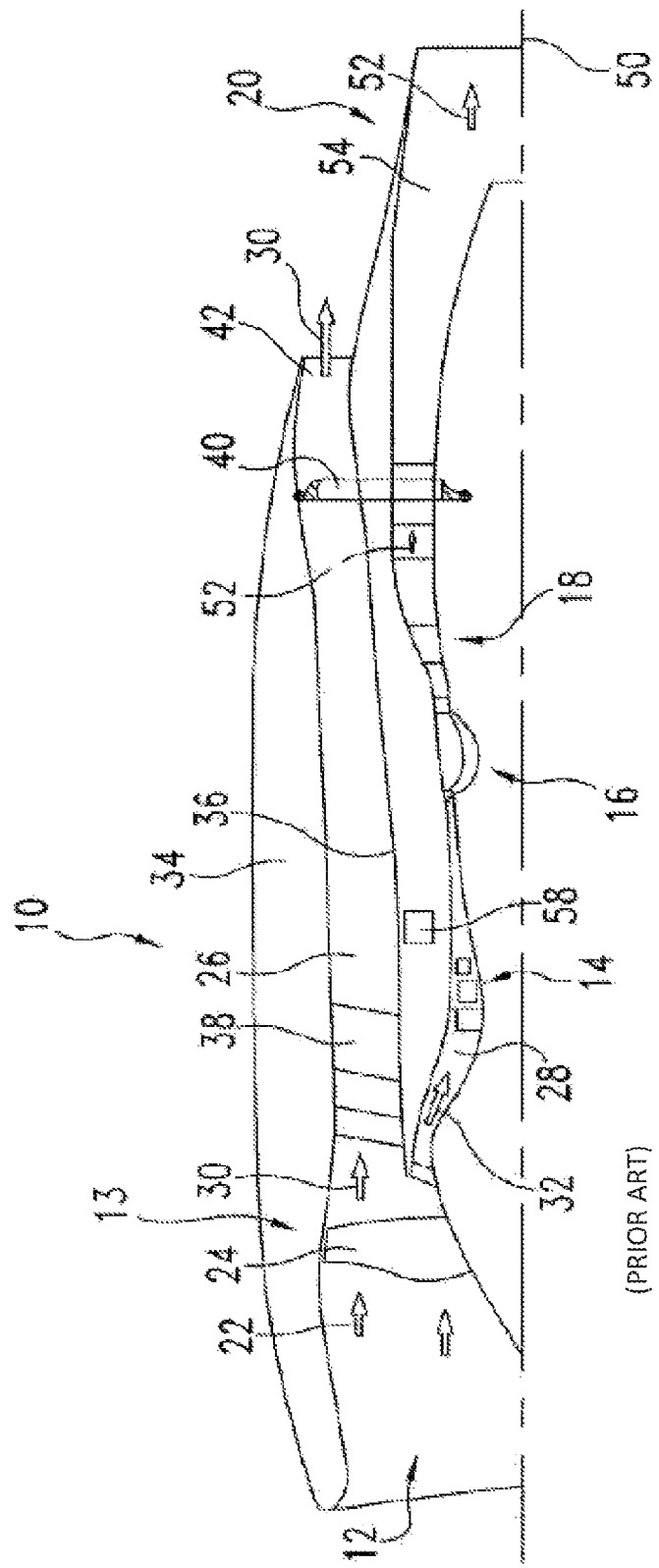
FIG. 1 is a schematic side cross-sectional view of a conventional turbofan engine.

For purposes of promoting an understanding of the principles of the disclosure, reference will now be made to the embodiments illustrated in the drawings, and specific language will be used to describe the same. It will nonetheless be understood that no limitation of the scope of the disclosure is intended by the illustration and description of certain embodiments of the disclosure. In addition, any alterations and/or modifications of the illustrated and/or described embodiment(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Referring to FIG. 1, a schematic view of a turbofan engine 10 is depicted. While the turbofan engine 10 is illustrated in simplistic schematic form, it should be understood that the present disclosure is not limited to any particular engine design or configuration and as such may be used with any turbofan engine having a range of complexities including multiple spools (multiple turbines operationally connected to multiple compressors), variable geometry turbomachinery, and in commercial or military applications. The turbofan engine 10 will be described generally, however significant details regarding gas turbine engine design and operation will not be presented herein as it is believed that the theory of operation and general parameters of gas turbine engines are well known to those of ordinary skill in the art.

The turbofan engine 10 includes an inlet section 12, a fan section 13, a compressor section 14, a combustor section 16, a turbine section 18, and an exhaust section 20. In operation, air illustrated by arrows 22 is drawn in through the inlet 12 and passes through at least one fan stage 24 of the fan section 13 where the ambient air is compressed to a higher pressure. After passing through fan section 13, the air can be split into a plurality of flow streams. In this exemplary embodiment, the airflow is spilt into a bypass duct 26 and a core passageway 28. Airflow through bypass duct 26 and core passageway 28 is illustrated by arrows 30 and 32 respectively. Bypass duct 26 encompasses core passageway 28 and can be defined by an outer circumferential wall 34 and an inner circumferential wall 36. Bypass duct 26 can also have one or more structural members passing therethrough such as a forward strut 38 and an aft strut 40 for connecting the outer wall 34 to the engine core structure. Bypass duct 26 can also include a bypass nozzle 42 operable for creating a pressure differential across the fan 24 and for accelerating the bypass airflow 30 to provide bypass thrust for the turbofan engine 10.

The core airflow 32 enters the core passageway 28 after passing through the fan section 13. The core airflow is then further compressed to a higher pressure relative to both ambient pressure and the air pressure in the bypass duct 26. The air is mixed with fuel in the combustor section 16 where the fuel/air mixture burns and produces a high temperature working fluid from which the turbine section 18 extracts power. The turbine section 18 is mechanically coupled to the fan section 13 and to the compressor section 14 via one or more rotatable shafts that are not shown in the drawings. The shafts rotate about a centerline axis 50 that extends axially along a longitudinal axis 50 of the engine 10, such that as turbine section 18 rotates due to the forces generated by the high pressure working fluid, fan section 13 and compressor section 14 section are rotatingly driven by turbine section 18 to produce compressed air. After passing through turbine section 18, the core exhaust flow represented by arrow 52 is accelerated to a high velocity through a core exhaust nozzle 54. A controller 58 sometimes referred to as an engine control module or ECM can be disposed within the engine 10 to transmit and receive signals to and from various devices (not shown) such as temperature and pressure sensors, accelerometers, position sensors, actuators and the like.

Figure 2:
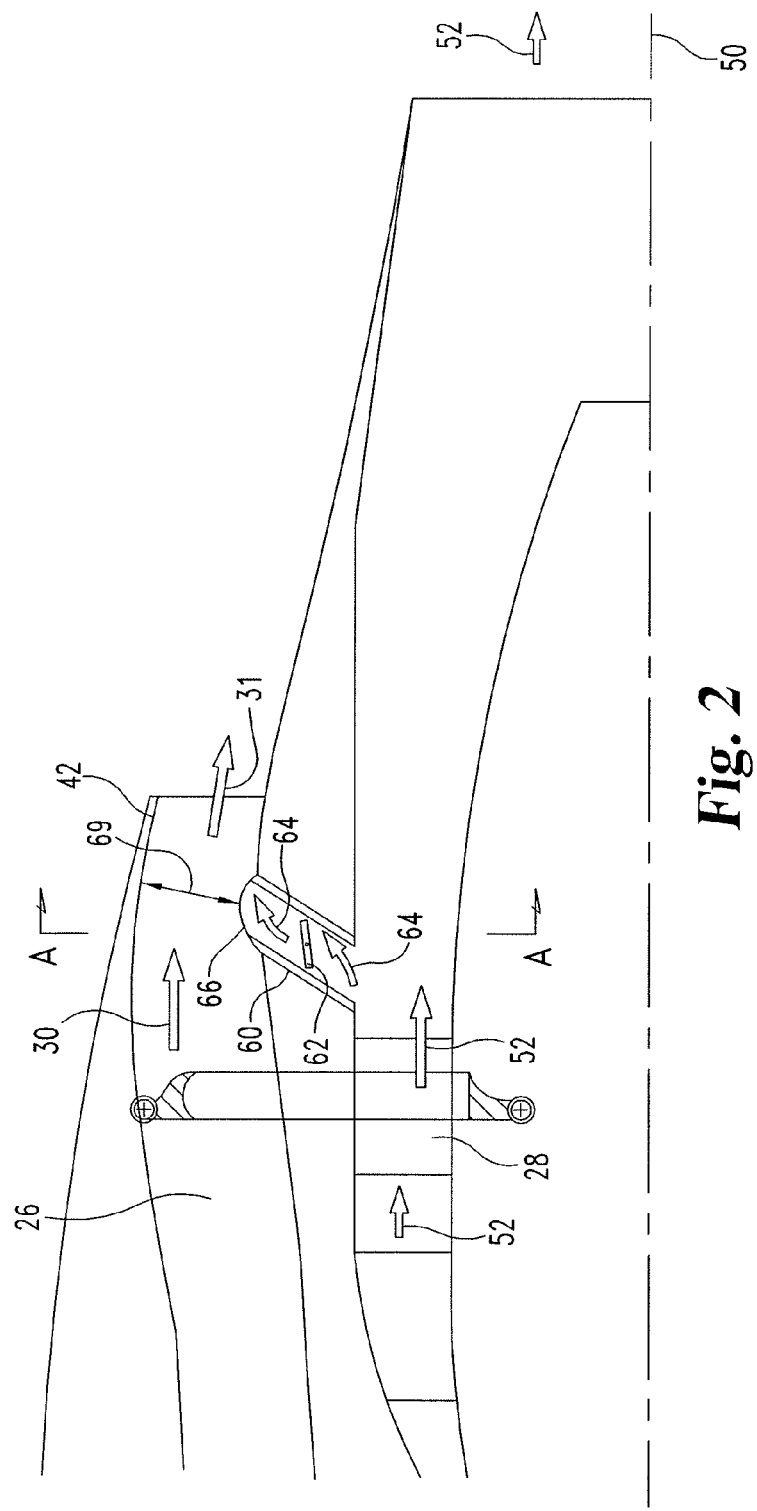
FIG. 2 is a schematic side cross-sectional view of an aft end of a turbofan engine according to one embodiment of the present disclosure.

Referring now to FIG. 2, the turbofan engine 10 of the present disclosure can include an auxiliary duct 60 positioned to fluidly connect core passageway 28 and bypass duct 26. Auxiliary duct 60 is operable to form a controlled passageway such that a portion of the exhaust flow from the core passageway 28 (depicted by arrow 52) can be transferred into bypass duct 26. Auxiliary duct 60 can include a control valve 62 such as a butterfly valve depicted herein or alternatively any other type of control valve operable in the described environment. When control valve 62 is open, a portion of the core exhaust flow 64 represented by arrows 64 can flow into bypass duct 26 because of the pressure differential between the fluid in core passageway 28 and the fluid in bypass duct 26. The auxiliary fluid flow 64 diverted into the bypass duct 26 will cause the pressure ratio across the fan section 13 to increase and the velocity in the bypass nozzle 42 to increase if the flow through the bypass duct 26 is not already choked. In some embodiments additional mechanical components having a venturi or an ejector can be used to facilitate fluid flow if the pressure differential between the core passageway 28 and the bypass duct 26 is not adequate to drive a desired flow rate at some operating conditions of the turbofan engine 10.

The auxiliary flow 64 can be directed into the bypass duct 26 proximate to the fixed bypass nozzle 42. The auxiliary flow 64 can produce an aerodynamic bubble or dam 66 as the flow enters the bypass duct 26 which can cause an aerodynamic restriction in the flow stream of the bypass duct 26 such that the effective flow area of the bypass duct 26 is reduced from a physical geometric flow area in the bypass duct 26 at that location. This aerodynamic dam 66 can be operable to form a variable effective flow area in the bypass duct 26 and in some conditions form an aerodynamic throat (minimum effective flow area of the nozzle) represented by arrow 69, which may or may not correspond to the location of the physical throat of the bypass nozzle 42. The variable effective flow area of the bypass nozzle 42 can be controlled with the control valve 62 associated with the auxiliary duct 60 by moving the control valve 62 from a closed position to a fully open position. Airflow represented by arrow 30 entering the bypass duct 26 through the inlet 12 is combined with the exhaust flow represented by arrow 64 passing through auxiliary duct 60 to produce a resultant mass flow represented by arrow 31. The velocity of resultant mass flow 31 is accelerated through the bypass nozzle 42 to generate increased bypass thrust. The size of the aerodynamic dam 66 in the bypass duct 26 can be controlled as a function of mass flow rate and velocity of the exhaust flow 64 exiting the auxiliary duct 60.

Figure 3:
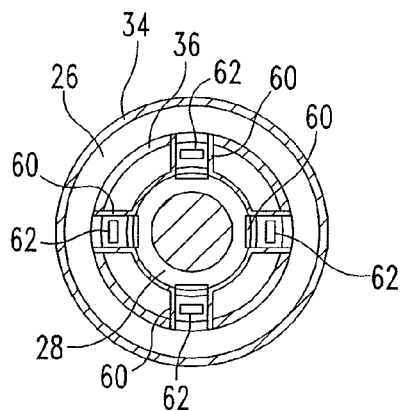
FIG. 3 is a schematic cross-sectional view of the turbofan engine of FIG. 2 taken along lines A-A.

Referring now to FIG. 3, a cross sectional end view through a plurality of auxiliary ducts 60 is depicted. The auxiliary ducts 60 can be formed in any functional cross sectional shape desired such as circular, oval, or otherwise.

By way of example and not limitation, four auxiliary ducts 60 are positioned equally spaced circumferentially about the core passageway 28. The auxiliary ducts 60 extend radially outward from the core passageway 28 through the inner wall 36 of the bypass duct 26 such that exhaust flow can move from the core passageway 28 into the bypass duct 26. Each auxiliary duct 60 can include a control valve 62 operable for controlling the flow rate of the exhaust flow stream into the bypass duct 26. In alternate embodiments of the present disclosure it is contemplated that more or less than four auxiliary ducts 60 can be disposed as desired. Also, it should be understood that the auxiliary ducts 60 may not be equally spaced around the core passageway 28, as it may be advantageous to move one or more of the auxiliary ducts 60 from equally spaced orientation for a variety of reasons such as strut or other structural interference.

Figure 4:
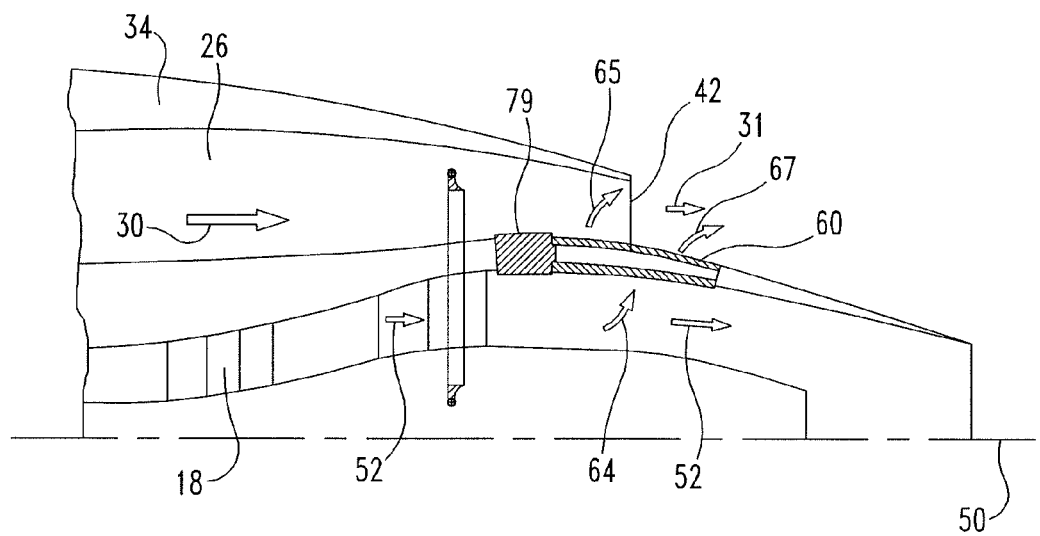
FIG. 4 is a schematic cross-sectional view of the aft end of a turbofan engine according to another embodiment of the present disclosure.

Referring now to FIG. 4, an alternate embodiment of the present disclosure is illustrated. In this configuration the auxiliary duct 60 is elongated along the longitudinal axis 50 such that a portion (represented by arrow 65) of the auxiliary flow 64 enters into the bypass duct 26 upstream of the bypass nozzle 42 and a portion (represented by arrow 67) enters the bypass flow stream downstream of the bypass nozzle 42. This configuration can include the capability of forming an aerodynamic throat with the auxiliary flow 64 downstream of the physical throat of the bypass nozzle 42. The auxiliary duct 60 shown in FIG. 4 provides additional means for the controller to increase the efficiency of the turbomachinery at off design points of operation. For example at operation conditions wherein the mass flow rate of the bypass flow stream is relatively low, the nozzle 42 of the bypass duct 26 may not be sized to choke the flow and therefore not be able to maximize the exit velocity. If the bypass nozzle 42 is not sized to choke the flow at some lower flow levels, an aerodynamic throat can be formed such that the effective flow area can be smaller just downstream of the exit of the bypass nozzle 42 and provide additional thrust due to the higher bypass nozzle 42 exit velocity.

An ejector 79, sometimes called an ejector nozzle can also be included in one or more embodiments as shown schematically in FIG. 4. Other forms, positions, and configurations of the ejector 79 can be used with any embodiment set forth in the present disclosure. The ejector 79 can be used to encourage flow from the core passageway 28 to the bypass duct 26 when an adverse pressure gradient at a particular operating condition of the engine 10 would prevent a desired auxiliary flow rate. The ejector 79 can cause a positive static pressure differential to form across the core and bypass flow paths to drive a desired auxiliary flow rate.

Figure 5:
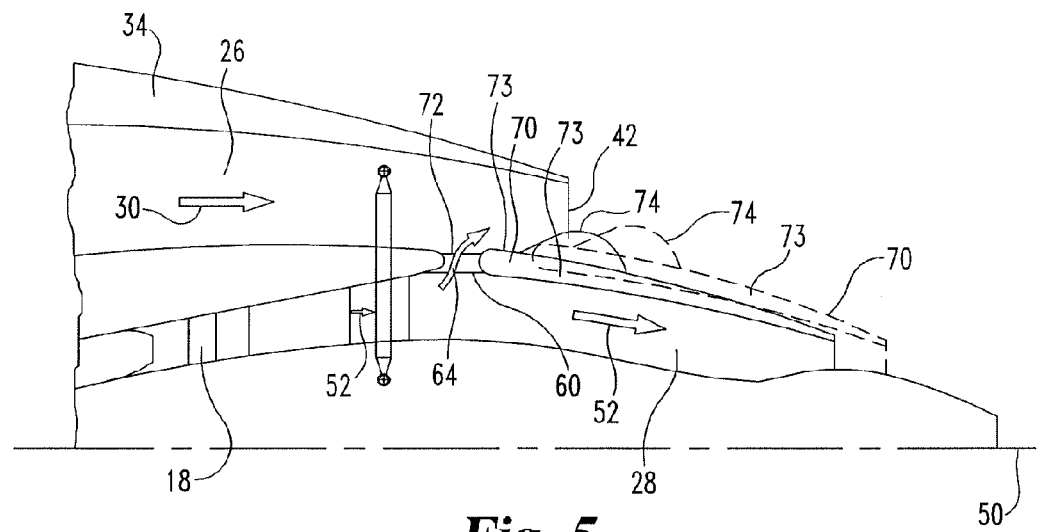
FIG. 5 is a schematic cross-sectional view of the aft end of a turbofan engine according to another embodiment of the present disclosure.

Referring now to the FIG. 5, another embodiment of the present disclosure is illustrated. The auxiliary duct 60 can include a sliding wall 70 movable between a fully closed position and a fully open position. The sliding wall 70 is shown partially open in solid line and fully open in phantom line in this view. The sliding wall 70 can be formed as full 360° circumferential wall surrounding the core passageway 28 or alternatively can be formed in a plurality of sliding wall segments that can encompass the passageway 28 either fully or partially with intermittent solid wall sections formed therebetween. In one form, the auxiliary duct 60 includes a variable area opening 72 that can extend in the circumferential direction to form an elongated circumferential slot. In another form, the variable area opening 72 can be segmented into a plurality of segments to conform to a plurality of sliding wall 70 segments. Although not shown, one or more fluid tight seals can be utilized with the sliding wall 70 to seal against static structure of the engine 10 so that core fluid flow 64 can pass through the variable area opening 72 only when the sliding wall 70 is open.

The sliding wall 70 can include an outer profile 73 having a protrusion 74 extending radially outward into the bypass duct 26. The outer profile 73 of the sliding wall 70 can form a portion of an inner wall of the throat of the bypass nozzle 42. The protrusion 74 of the sliding wall 70 can have an arcuate shape such that the flow area of bypass nozzle 42 can change in size and axial location as the slidable wall 70 moves between open and closed positions. In this form, the sliding wall 70 is configured to provide both a variable geometry bypass nozzle 42 and to provide means for directing variable auxiliary flow 64 from the core passageway 28 into the bypass duct 26. As with previously disclosed embodiments, the auxiliary flow 64 can be used to control pressure ratio across the fan stage 24 as well as define a variable effective flow area of the bypass nozzle 42.

Controlling the turbofan engine 10 to an optimum fan pressure ratio, bypass ratio, overall pressure ratio, and turbine inlet temperature will ensure a maximum specific thrust (thrust per pound of fuel) and by definition a minimum fuel consumption. The optimum point for each of these parameters will change based on flight conditions such as altitude, ambient temperature, ambient pressure, flight Mach number and thrust required. Controlling an auxiliary flow from the core exhaust stream to the bypass flow stream provides means for the control system of the turbofan engine 10 to optimize the above parameters.

In operation, the controller 58 can determine a position of an auxiliary control valve 62 or of a sliding wall 70 that provides a required turbofan engine thrust in the most efficient way possible. Turbofan engine thrust is generated from a combination of the bypass flow rate and the core flow rate. As thrust is a function of mass flow and velocity of the fluid streams exiting the bypass exhaust nozzle 42 and the core exhaust nozzle 54, the auxiliary control valve 62 or sliding wall 70 can be used to manipulate the thrust split between the core flow rate and the bypass flow rate. Additional mass flow diverted from the core flow path via the auxiliary duct 60 or variable opening 72 can increase both the mass flow and the velocity of the bypass flow stream which will generate higher thrust from the bypass flow stream.

The controller 58 can receive sensor signals associated with the turbomachinery such as the fans, compressors, and turbines to determine and control the operational efficiency of these components. For example, at a particular operating condition of turbofan engine 10, the controller can determine the ideal mass flow rate and pressure ratio across the fan section 13, compressor section 14 and turbine section 18. If the controller 58 determines that the required thrust at that operating condition can be generated in a more efficient manner using auxiliary flow transferred from the core passageway 28 to the bypass duct 26, then a command will be sent to the control valve 62 or slidable wall 70 to move to a desired position. When a portion of the core exhaust flow is diverted to the auxiliary duct 60, the back pressure on the turbine section 18 will drop and cause the pressure ratio across the turbine section to increase such that additional power can be extracted from the turbine section 18. Fan pressure ratio will increase due the increased mass flow delivered to the bypass duct 26 through the auxiliary duct 60. Fueling can be decreased if additional turbine power is not required at that operating condition. The interaction of the various controllable parameters is complex and the controller 58 can use computer algorithms, lookup tables and the like to determine the ideal position of the control valve(s) 62 or slidable wall 70 to operate the turbofan engine 10 in the most efficient way possible. In this manner, the controller 58 can optimize the turbofan engine 10 operation such that fuel consumption is minimized at all operating conditions.

Figure 6:
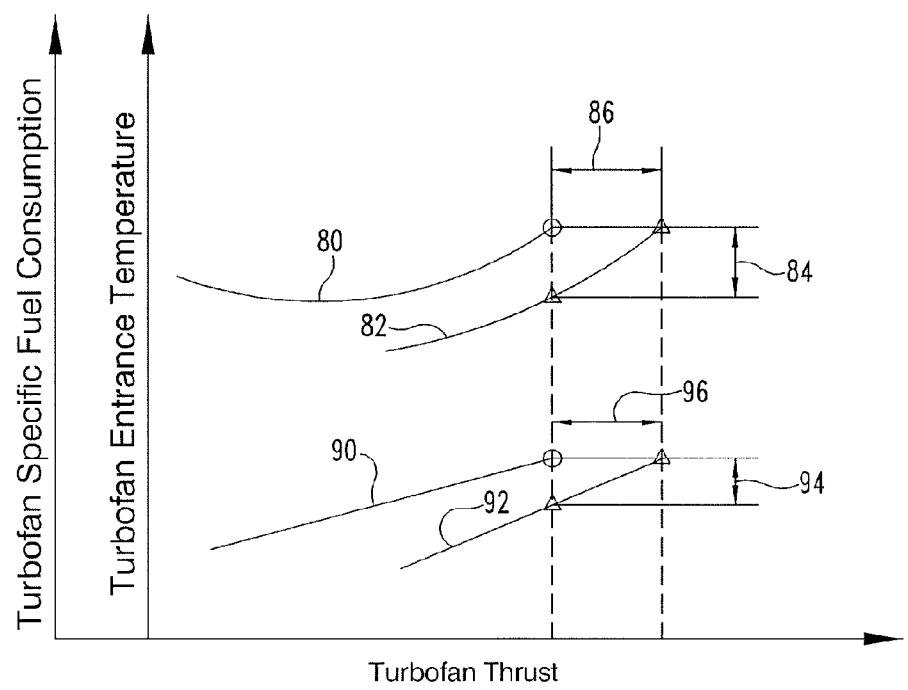
FIG. 6 is an illustrative graph showing improvement in fuel consumption and reduction of turbine inlet temperature according the present disclosure.

Referring now to FIG. 6, an illustrative plot showing improvement in specific fuel consumption (SFC) and a reduction in turbine inlet temperature is graphically shown. A first line 80 is a plot of SFC as a function of thrust for a conventional turbofan engine. A second line 82 is a plot of SFC as a function of thrust for a turbofan engine having an auxiliary duct to transfer a portion of core exhaust flow into a bypass flow stream. Arrow 84 illustrates the fuel consumption advantage at a fixed thrust level between the conventional turbofan and the turbofan defined by the present disclosure. Arrow 86 illustrates the thrust advantage at a fixed fuel consumption level between the conventional turbofan and the turbofan defined by the present disclosure.

A third line 90 is a plot of turbine inlet temperature as a function of thrust for a conventional turbofan engine. A fourth line 92 is a plot of turbine inlet temperature as a function of thrust for a turbofan engine having an auxiliary duct to transfer a portion of core exhaust flow into a bypass flow stream. Arrow 94 illustrates the turbine inlet temperature reduction advantage at a fixed thrust level between the conventional turbofan and the turbofan defined by the present disclosure. Arrow 96 illustrates the thrust advantage at a fixed turbine inlet temperature level between the conventional turbofan and the turbofan defined by the present disclosure.

While the invention has been described in connection with what is presently considered to be the most practical and preferred embodiment, it is to be understood that the disclosure is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and embodiment lacking the same may be contemplated as within the scope of the disclosure, that scope being defined by the claims that follow. In reading the claims it is intended that the words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine comprising:
   a bypass flow path having an inlet and an outlet including a bypass nozzle positioned downstream of a fan;
   a core flow path having a compressor, a combustor, a turbine and an exhaust nozzle positioned downstream of the turbine; the turbine operable to rotatingly drive the fan,
   an auxiliary duct positioned downstream of the turbine and upstream of a trailing edge of the bypass nozzle, fluidly connecting the core flow path and the bypass flow path; and a control valve operably connected to the auxiliary duct to control fluid flow from the core flow path to the bypass flow path,
wherein the control valve is configured to increase a bypass thrust of the gas turbine engine when the control valve is in an open position,
wherein the bypass thrust is generated in the same direction as a core thrust.

2. The gas turbine engine of claim 1, wherein the auxiliary duct directs fluid flow from the core flow path to the bypass flow path upstream of the bypass nozzle.

3. The gas turbine engine of claim 1, wherein the auxiliary duct directs fluid flow from the core flow path to the bypass flow path proximate the bypass nozzle.

4. The gas turbine engine of claim 1, wherein the auxiliary duct directs at least a portion of the fluid flow from the core flow path to the bypass flow path downstream of the bypass nozzle.

5. The gas turbine engine of claim 1, wherein the auxiliary duct includes a plurality of auxiliary ducts positioned circumferentially around the core flow path, and further comprising a plurality of valves to control flow through the plurality of auxiliary ducts.

6. The gas turbine engine of claim 1, wherein the auxiliary duct is defined by a 360 degree continuous circumferential slot formed in a wall between the core flow path and the bypass flow path.

7. The gas turbine engine of claim 1, wherein the control valve is defined by a slidable wall operable to move between a first position and a second position, and wherein the first position defines a closed auxiliary duct and the second position defines a fully open auxiliary duct.

8. The gas turbine engine of claim 7, wherein the slidable wall further includes a protrusion extending from an outer profile, and wherein the protrusion is configured to change an effective flow area of the bypass nozzle when the slidable wall is moved between the first and second positions.

9. A bypass turbofan engine comprising:
a core having a passageway operable for carrying a core flow stream;
a compressor, a combustor, a turbine and an exhaust nozzle positioned in the core, wherein the exhaust nozzle is positioned downstream of the turbine; the turbine operable to rotatingly drive a bypass fan,
a bypass duct substantially encompassing the core and operable for carrying a bypass flow stream;
a bypass nozzle positioned proximate an outlet of the bypass duct; and
an auxiliary duct operable to be opened and closed, defining a fluid connection between the core flow stream and the bypass flow stream, wherein the auxiliary duct is disposed downstream of the turbine and upstream of a trailing edge of the bypass nozzle, and is operable for carrying an auxiliary flow stream;
wherein the auxiliary duct diverts fluid flow from the core flow stream to the bypass flow stream increasing a thrust of the bypass turbofan engine.

10. The bypass turbofan engine of claim 9, wherein the bypass fan is operable to compress the bypass flow stream positioned proximate an inlet of the bypass duct.

11. The bypass turbofan engine of claim 9, wherein the auxiliary duct directs the auxiliary flow stream into the bypass flow stream proximate the bypass nozzle.

12. The bypass turbofan engine of claim 9, wherein the auxiliary duct directs at least a portion of the auxiliary flow stream downstream of the bypass nozzle.

13. The bypass turbofan engine of claim 9, wherein the auxiliary duct further comprises:
a plurality of auxiliary ducts positioned circumferentially around the core passageway; and
a plurality of flow control valves operably connected to the plurality of auxiliary ducts.

14. The bypass turbofan engine of claim 9, wherein the auxiliary duct further comprises:
a 360 degree continuous circumferential slot formed in a wall between the core flow stream and the bypass flow stream.

15. The bypass turbofan engine of claim 9, further comprising:
a slidable wall sealingly engaged with a wall separating the core flow stream and the bypass flow stream, the slidable wall being movable between a first position and a second position; and
wherein the slidable wall extends 360 degrees circumferentially around the core passageway to open and close the auxiliary duct when moved between the first and second positions; and
wherein an effective flow area and axial location of a throat of the bypass nozzle changes as the slidable wall is moved between the first and second positions.

16. The bypass turbofan engine of claim 9, further comprising: an ejector nozzle positioned downstream of the turbine section being operable to encourage fluid flow from the core passageway to the bypass duct.

17. A method for controlling a turbofan engine comprising:
compressing, with a fan, a first fluid stream flowing through a bypass duct;
accelerating, with a bypass nozzle, the first fluid stream as the first fluid stream exits the bypass duct;
compressing, with a compressor, a second fluid stream flowing through a core passageway;
expanding, with a turbine, the second fluid stream flowing through the core passageway; the turbine operable to rotatingly drive the fan,
diverting, with an auxiliary duct positioned downstream of the turbine and operable to be opened and closed, a portion of the second fluid stream into the first fluid stream increasing a thrust of the turbofan engine; and
aerodynamically changing an effective flow area of the bypass nozzle with fluid diversion into the first fluid stream.

18. The method of claim 17, further comprising: changing a pressure ratio of the fan with fluid diversion into the first fluid stream.

19. The method of claim 17, further comprising:
changing the backpressure on the turbine with fluid diversion into the first fluid stream; and
minimizing fuel consumption at an operating condition of the turbofan engine by controlling a flow rate of fluid diversion into the first fluid stream.

* * * * *

UNITED STATES PATENT AND TRADEMARK OFFICE
CERTIFICATE OF CORRECTION

PATENT NO. : 9,759,133 B2  
APPLICATION NO. : 14/199237  
DATED : September 12, 2017  
INVENTOR(S) : Dmitriy B. Sidelkovskiy Page 1 of 1

It is certified that error appears in the above-identified patent and that said Letters Patent is hereby corrected as shown below:

On the Title Page

Item [72], Inventor Dmitriy B. Sidelkvoskly should read Dmitriy B. Sidelkovskiy.

Signed and Sealed this  
Thirteenth Day of March, 2018

Andrei Iancu  
*Director of the United States Patent and Trademark Office*